United States Patent [19]

Schusler

[11] 3,767,468

[45] Oct. 23, 1973

[54] AIR-COOLED BATTERY
[75] Inventor: James B. Schusler, Brunswick Acres, N.J.
[73] Assignee: Gulton Battery Corp., Metuchen, N.J.
[22] Filed: Sept. 20, 1971
[21] Appl. No.: 181,829

[52] U.S. Cl. .............................. 136/166, 136/180
[51] Int. Cl. ...................................... H01m 1/00
[58] Field of Search ................... 136/161, 166, 180, 136/165, 168

[56] References Cited
UNITED STATES PATENTS
1,152,247   8/1915   Walker .............................. 136/180
1,313,512   8/1919   Bedell et al. ....................... 136/180
2,273,244   2/1942   Ambruster ......................... 136/180
2,385,127   9/1945   Carlile .............................. 136/180

Primary Examiner—A. B. Curtis
Assistant Examiner—H. A. Feeley
Attorney—Darby & Darby

[57] ABSTRACT

Multicell storage battery apparatus is disclosed in which each of the individual cell units within the battery is provided with a plurality of external asymmetrical grooves extending, in the preferred form, from the bottom to the top of each sidewall of the cell. The grooves of contiguous sidewalls of adjacent cells are laterally offset to form asymmetrical ventilating passages between the cells. Means are provided for conducting air through the passages to cool the battery.

10 Claims, 3 Drawing Figures

INVENTOR
JAMES B. SCHUSLER
BY Darby & Darby
ATTORNEYS

AIR-COOLED BATTERY

The invention relates to storage batteries and more particularly to storage batteries of the multicelled type wherein ventilation grooves are provided for use in cooling each individual cell of the battery to dissipate heat developed during charging and discharging of the battery.

BACKGROUND OF THE INVENTION

Heretofore multicelled air-cooled batteries have been provided with a plurality of spacer elements separating the individual cells of the battery. These spacer elements have frequently taken the form of spaced apart angular clips. When two cell units are placed side by side, the clips on the adjacent faces of the cell containers register and are adapted to receive therebetween an upright spacing strip of wood or other suitable material. The spaces between the spacing strips have provided passages for air ventilation whereby the heat generated during the charging of the battery may be dissipated and the cells cooled.

Other techniques have also been employed for providing air ventilation of multicelled storage batteries. For example, the battery tank or external housing of the battery may be provided with spaced apart internal vertical grooves or channels. An outer corrugated sheath or sleeve may be placed around each individual cell to act as a spacer for separating the cells and providing the ventilating air passages.

Such prior ventilating techniques have been partially effective in dissipating heat generated within each of the battery cells during charging of the battery. However, the ability of the cell container to disperse such heat is limited by the effective surface area of the cell exposed to the ventilating air streams. The prior arrangement may be effective to separate the cells and provide an air passage between them, but it has not served to increase the cooling efficiency of the cell container walls.

One prior technique for increasing the effective surface area of the cell walls to facilitate cooling has been to provide each of the cells with a plurality of vertically arranged outer grooves. In a multicell battery formed from cells having such grooves, each cell is flanked on all sides by vertically arranged slots open at the top and at the bottom to allow air to pass through to cool the exterior wall of the cell. The cooling efficiency of such arrangement is somewhat improved over the technique of merely using spacer members to separate the cells.

One disadvantage of this prior arrangement is that the grooves formed in one side wall of the cell are symmetrical with grooves formed in a parallel side wall. When positioned or stacked within a tank forming the housing for a multicell storage battery, the ribs of contiguous sidewalls of adjacent cells defining such ventilating grooves abut to form air passages therebetween. The symmetry of rib and groove location for each cell stacked within the prior type of battery results in substantial alignment between such abutting ribs. Accordingly, each of the air passages defined between the cells has a total internal surface area substantially the same as the sum of the internal surface areas of each pair of juxtaposed grooves forming such passage.

Another disadvantage of such prior cooling techniques is the tendency of the grooves and ribs in the sidewalls of adjacent cell members to interlock or to dovetail together thereby eliminating the air passages between the cells. Proper alignment of the cells therefore is tedious and expensive.

Accordingly, the present invention provides multicell storage battery apparatus in which transverse grooves are formed between parallel spaced rib portions preferably molded in the side walls of each of the individual cells of the battery. The grooves are asymmetrical, in the sense that each of the grooves in one side wall of the cell is laterally offset relative to a corresponding groove in a parallel side wall of the cell. When the battery cells are stacked within the tank or outer housing of the battery, there is substantial alignment between contiguous side walls of adjacent cells. However, since the ribs and grooves of one cell side wall are laterally offset relative to the ribs and grooves of the adjacent cell side wall, there is partial non-alignment of abutting rib members. Each rib member of one cell therefore partially overlaps a portion of the groove adjacent the abutting rib member of an adjacent cell. A plurality of substantially asymmetric air passages is thereby formed between adjacent cells of the battery. The internal surface area of each of these air passages includes a portion of the outer surface of two of the adjacent ribs defining such passage. Therefore the total internal surface area of each air passage is greater than the sum of the internal surface areas of the pair of juxtaposed grooves forming the passage. The result is an improved cooling efficiency and faster dissipation of heat conducted to the surface of the cell wall from within the cell during charging of the battery.

Another advantage of the present apparatus is that individual cells may be placed within the tank housing of a multicell storage battery without regard to alignment of one cell wall relative to another. The asymmetrical configuration of contiguous cell side walls obviates any tendency of juxtaposed grooves and ribs to dovetail or otherwise interlock. There is thus no need for spacers or other alignment aids, and the storage battery of the present invention may be assembled with a minimum of effort and expense.

It is one object of the present invention to provide a multicell storage battery having improved means for the circulation of air between the cells to cool the battery during charging.

Another object of the present invention is to provide a multicell storage battery wherein the exterior walls of the individual cells are molded with transverse grooves to provide a path for air-cooling of the battery.

Still another object of the present invention is to provide a multicell storage battery in which the total internal surface area of each of the air passages formed between contiguous cell walls is greater than the sum of the internal surface areas of each pair of juxtaposed grooves forming part of the air passage.

Yet another object of the present invention is to provide a battery cell having a plurality of transverse grooves formed in the exterior walls and in which each of the grooves formed in one exterior wall of the cell is laterally offset from a corresponding groove formed in a parallel wall of the cell.

A further object of the present invention is to provide an air-cooled storage battery which is substantially the same size as a non-air cooled battery having the same number of cells.

BRIEF DESCRIPTION OF THE DRAWINGS

For a better understanding of the present invention, reference may be had to the accompanying drawings in which.

BRIEF DESCRIPTION OF THE PREFERRED EMBODIMENTS

Figure 1:
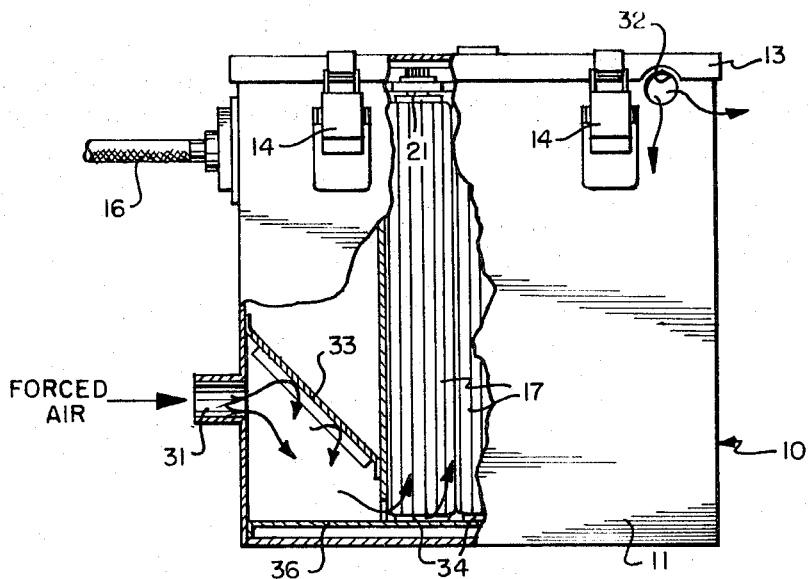
FIG. 1 is a side elevational view partly in cross-section of a multicelled storage battery constructed in accordance with the present invention.
Figure 2:
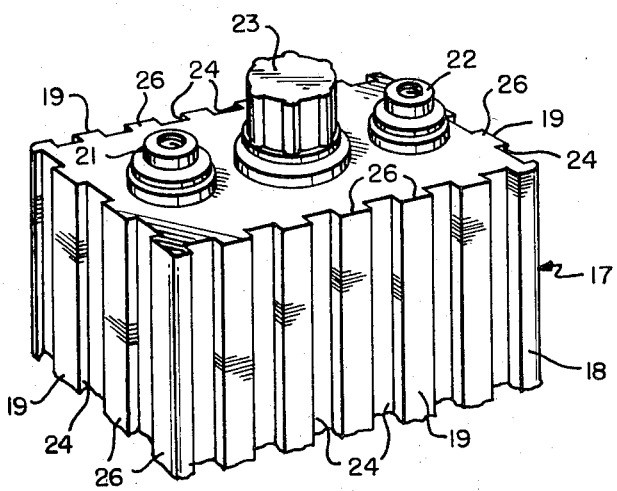
FIG. 2 is a perspective view of the top portion of a single cell formed in accordance with this invention and to be employed in a multicell battery.

Referring now to the drawings and in particular to FIGS. 1 and 2, there is illustrated a multicelled storage battery, generally indicated by reference numeral 10, and having a tank housing or case 11 which contains a plurality of electrically interconnected battery cell units. The housing 11 is provided with a detachable cover member 13, secured to the side walls of the tank by means of conventional latches 14. A power take off cable 16 may be connected through one side wall of the tank 11 to the power cells.

A typical battery cell formed in accordance with the invention is depicted in FIG. 2 and is generally indicated by reference numeral 17. The cell 17 is provided with a jar or container 18 which is bounded by substantially parallel faces or side walls 19. In the preferred embodiment, each individual cell 17 has a substantially rectangular cross-section and is higher than it is wide. It will be understood that other configurations for the cells may also be suitable, and that the invention is not to be limited by any particular shape.

The cell 17 is provided at its upper face or end with a pair of electrical poles or contacts 21 and 22, and a preferably removable valve member 23 for allowing free gassing of the cell.

The side walls 19 of the cell 17 are formed with a plurality of transverse grooves or channels 24. In the preferred embodiment the channels 24 are substantially vertically arranged and run from top to bottom along the entire length of each of the side walls 19. It is important to note that the channels need not be vertically aligned nor need they be parallel to one another as depicted in FIGS. 1 and 2. It has been found that a plurality of vertical channels displays superior cooling characteristics and this arrangement is therefore preferred, however other configurations may be employed without departing from the scope of the invention.

The channels 24 are formed by a plurality of spaced apart vertical rib members 26 forming part of each of the side wall portions 19. In the preferred embodiment, the rib members 26 are parallel and are formed integrally with the cell jar. It is characteristic of the preferred type of cell 17 that the dimensions of the channelled cell including the rib members are the same as for the prior type of non-channelled cell. The cooling requirements of the cell can therefore be met in accordance with the invention, without adding to the length, width or height of the previous battery cells. Additionally, it is preferred that heat generated within the cell, as during charging or discharging of the battery for example, be conducted to the exterior surface area of the jar 18 with maximum efficiency. Such heat may then be effectively dissipated by the ventilating techniques of the invention, described in detail below. It will be apparent, that separate rib members may be employed as spacers between the cells without departing from the scope of the invention, however this will result in somewhat inefficient heat transfer across a mutual interface between the ribs and the exterior jar wall. Integral molding of the ribs in the external surface of the jar is the preferred form.

Figure 3:
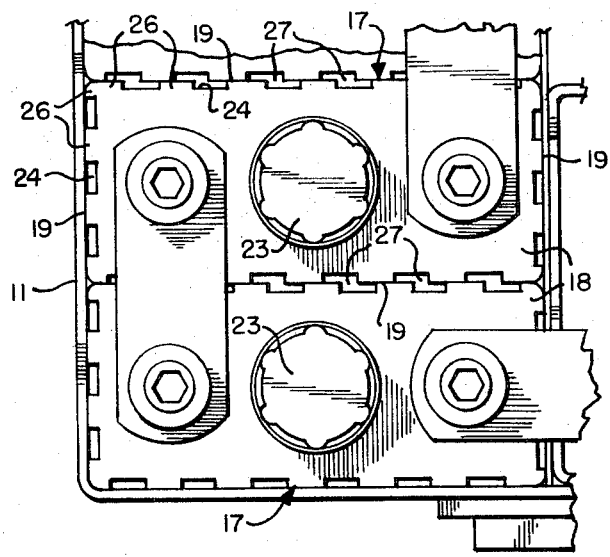
FIG. 3 is a partial plan view of the top of a multicelled battery in accordance with the invention and showing several electrically interconnected and stacked single cell units.

Referring now to FIG. 3, the channels 24 are molded into the side walls of the cell such that each channel 24 in one side wall is laterally offset by a predetermined amount from a corresponding channel in a parallel side wall. For example, assuming, as is shown in FIG. 3, that each of ribs 26 is of the same width, then the row of vertical channels formed in one side wall of the cell 17 begins laterally closer to the adjacent side wall of such cell than does the row of channels formed in a parallel side wall of the cell. The result is that when the individual battery cells are stacked or placed in contiguous relationship within the tank 11, adjacent rib members of opposed cells abut in a partially overlapping manner so that a lateral portion of each of the ribs forms part of the surface area of the air passage formed thereby between the cells. The result is a plurality of asymmetrical passages 27 for conducting the ventilating air. The total internal surface area of each one of the air passages is greater than the sum of the surface areas of each of the juxtaposed channels forming such air passage. The present invention therefore provides superior heat dissipating characteristics.

Furthermore, the asymmetry of the contiguous cell side walls serves to obviate any tendency of the respective channels and ribs to interlock or dovetail to any degree, thereby interfering with the passage of cooling air.

In the preferred embodiment, cooling air is conducted from the bottom of the channels to vent from the tank 11 at the top, as indicated in FIG. 1. An inlet aperature 31 may be formed adjacent the lower end of one side wall of the tank. Air entering the inlet may be deflected to the bottom of the battery cells by means of a deflecting plate 33.

In the preferred embodiment, each of the battery cells rests on a perforated platform or plate 36 which extends across the lower end of the tank. The plate 36 is spaced from the bottom of the tank thereby forming a cavity or air space beneath the cells. Air entering the inlet 31 is deflected downwardly by the plate 33 and passes through the perforations in the plate 36 to form a plenum in the space beneath the cells. Air from the plenum passes up through the plate 36 and into the air passages 27 between the cells. An outlet 32 is provided adjacent the upper end of one side wall of the tank to vent the air passing between the cells.

It will be understood by way of example, that a plurality of spacers or protuberances 34 formed integrally with the bottom wall of each of the individual cells may be employed to raise the body of the cells from the bottom of the tank to permit the plenum to form beneath the cells. The perforated plate 36 is merely the preferred technique.

While only the preferred form of the invention has been described in detail herein, it will be apparent to those skilled in the art that modifications may be made in the apparatus disclosed without departing from the scope of the invention.

What is claimed is:

1. Storage battery apparatus comprising:
an outer housing;
a plurality of electrically interconnected contiguous battery cell units within said housing;
a container forming part of each of said cell units and having substantially parallel external faces, each of said containers having a plurality of substantially transverse channels formed in predetermined ones of said faces and extending substantially from one face edge to another, channels formed in one container face being parallel to and adapted partially to overlap corresponding ones of the channels formed in a contiguous container face to form a plurality of substantially asymmetric cooling passages between said contiguous cell units.

2. The apparatus of claim 1, wherein each of said channels is substantially parallel to adjacent ones of said channels.

3. The apparatus of claim 2, wherein said channels are formed in the side wall faces of said containers.

4. The apparatus of claim 3, wherein each of said channels is formed by spaced apart vertical rib members forming an integral part of said container.

5. The apparatus of claim 4, wherein each of said channels in one side wall face of one container is laterally offset relative to a corresponding channel in a parallel side wall face of said one container.

6. The apparatus of claim 5, wherein each of said channels in one side wall face of one of said contiguous containers is laterally offset from but overlaps at least approximately 40% of a corresponding channel formed in an abutting parallel side wall face of another of said contiguous containers to form an air passage between said abutting side wall faces having an internal surface area greater than the sum of the internal surface areas of each of said overlapping channels.

7. The apparatus of claim 1, wherein the internal surface area of each of said channels is substantially the same.

8. The apparatus of claim 1, wherein said housing is provided with inlet and outlet apertures for air conducted through said passages, each of said passages having one end in fluid flow communication with said inlet and the other end in fluid flow communication with said outlet.

9. The apparatus of claim 1 comprising in addition means connected to said outer housing for conducting air through said passages to cool the battery when the battery is charging and discharging.

10. A battery cell unit for interconnection with a plurality of substantially identical electrically interconnected battery cells within a charge storage device, said cell unit comprising at least a pair of substantially parallel external faces adapted for contiguous assembly with corresponding faces of an adjacent battery cell within the device, each of said faces having a plurality of spaced apart rib members formed therein and extending transversely thereof substantially from one face edge to another, said ribs defining in each of said faces a plurality of channels therebetween, the perimetric arrangement of ribs and channels being such that the lateral edges of each of said ribs on one face of said cell unit are positioned respectively in the planes of the longitudinal bisectors of a corresponding rib and adjacent channel formed on a parallel face of said cell unit.

* * * * *